Jan. 28, 1936.  W. R. KINNAIRD  2,029,105

VALVE

Filed Dec. 23, 1933

INVENTOR
WILLIAM R. KINNAIRD
BY
ATTORNEY

Patented Jan. 28, 1936

2,029,105

UNITED STATES PATENT OFFICE 2,029,105

VALVE

William R. Kinnaird, Chicago, Ill., assignor to Universal Oil Products Company, Chicago, Ill., a corporation of Delaware Application December 23, 1933, Serial No. 703,691

4 Claims. (Cl. 251—91)

This invention relates to improvements in valves for controlling the flow of fluids and more specifically refers to an improved type of valve particularly adapted to controlling the pressure in a stream of heated hydrocarbon oil wherein there is a tendency for the oil to deposit coke within the valve and for similar classes of service wherein coking and similar difficulties are encountered with ordinary types of valves.

Valves of the conventional globe, gate, plug or needle type have not proven satisfactory as pressure reducing and flow controlling devices in hot oil lines and similar classes of an obstructive nature to deposit within the valve. The angular fluid passage-way through the ordinary type of valve assists the accumulation of obstructing materials such as coke so that passage through the valve and its free operation is greatly hindered and in many cases rendered impossible.

The present invention provides a valve which is an unusual and advantageous departure from the conventional type of flow controlling mechanism. The path of flow of fluid through the valve of the present invention is, in all cases, a straight line between the inlet and outlet ports regardless of the degree to which the valve is opened or closed and there are no angular obstructions in the entire path of flow. This minimizes the tendency for coke or other obstructing materials to accumulate within the valve permitting such material to be swept along through and out of the valve with the stream of fluid passing therethrough.

As a further feature of the invention special provision is made for cooling and/or lubricating the moving parts of the valve, when desired, and/or for injecting suitable cooling material into the main stream of fluid passing through the valve. The latter feature is of particular advantage in handling highly heated hydrocarbon oils and the like, for example, in processes for the pyrolytic conversion of hydrocarbon oils wherein it is desirable to reduce the pressure employed between various portions of the cracking apparatus and wherein cooling is desirable in conjunction with the pressure reduction.

One specific form of the apparatus of the present invention may comprise a valve for controlling the flow of fluids having a main valve body with inlet and outlet ports, two cylindrical, rotatable members within the main valve body, the cylindrical surfaces of which adjoin at a line along their circumference, a port through said cylindrical members intercepting said line on their adjoining surfaces at right angles thereto, coinciding with said inlet and outlet ports and means for simultaneously rotating said cylindrical members in opposite directions whereby to increase and decrease the effective size of said port. In addition, means may be provided for cooling and/or lubricating the moving parts within the main valve body as well as the packing and valve stems, and/or for injecting a suitable cooling fluid into the main stream of fluid flowing through the valve.

The accompanying diagrammatic drawing illustrates one specific form of valve of the type embodied by the present invention, the features of which will be more apparent with reference to the following description of the drawing.

Figure 1:
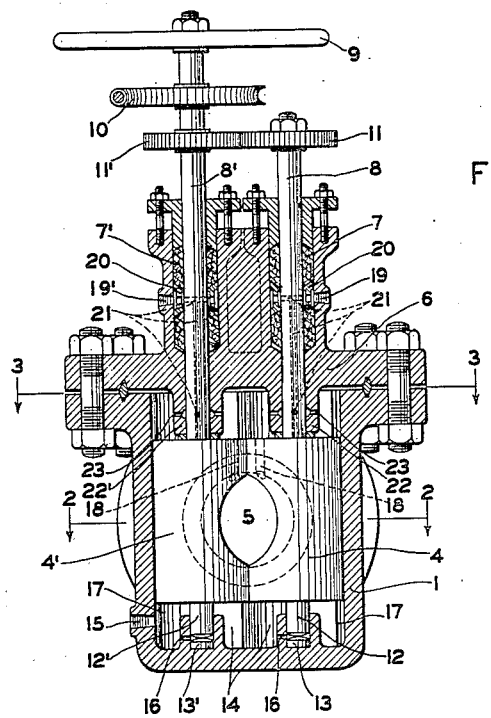
Figure 1 is a sectional elevational view of the valve.
Figure 2:
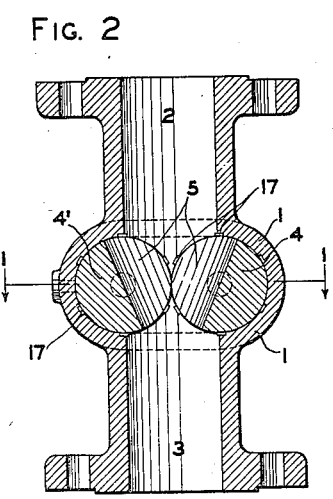
Figure 2 is a sectional view taken on line 2—2 of Fig. 1.
Figure 3:
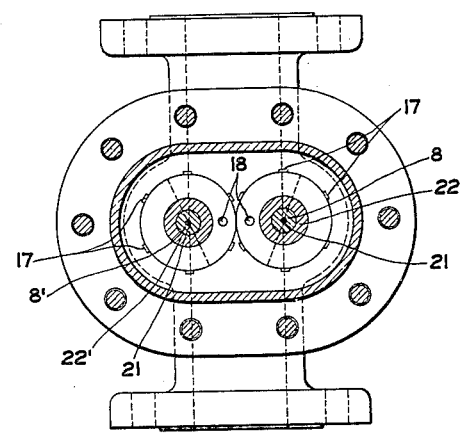
Figure 3 is a sectional view taken on line 3—3 of Fig. 1.

Referring in detail to the drawing, the main body of the valve is indicated at 1, the inlet port of which is indicated at 2 and the outlet port at 3. Two similar cylindrical members 4 and 4' are mounted within the main valve body in the path of flow of fluid flowing from the inlet to the outlet port. The cylindrical members coincide at a line along their outer circumference corresponding to the vertical center line through the valve and port or orifice 5 is provided through the cylindrical members preferably corresponding in diameter to the inlet and outlet ports and in direct line therewith so that when the 2 cylindrical members 4 and 4' are in a wide open position a free and unobstructed path of circular cross-section is provided, extending in a straight line through the entire valve body from the inlet to the outlet.

A suitable bonnet 6 is flanged to the upper portion of the main valve body and is provided with packing means 7 and 7' for the respective valve stems 8 and 8' which are attached to cylindrical members 4 and 4', respectively.

A hand-wheel 9 may be attached to one valve stem (8', for example) or a worm-gear arrangement 10 may be provided in case motivating means or remote control of the valve is desired and meshing spur gears 11 and 11' are provided on the respective shafts 8 and 8' so that when one shaft is rotated in a clockwise direction the other shaft is simultaneously rotated in a counter-clockwise direction and vice-versa. In this manner the effective opening through port 5 may be decreased from the maximum by rotation of hand-wheel 9 or by operation of gearing mechanism 10 so that the valve may be fully opened, fully closed or adjusted to any desired intermediate position and, in all cases except when the valve is in a fully closed position, the path of flow of fluid therethrough is in a straight line through the entire valve body from the inlet to the outlet port with no angular obstructions in the path of flow.

The inner shape of the main valve body corresponds to the cylindrical shape of members 4 and 4' which fit snugly into the main valve body in order to prevent leakage of the main stream of fluid passing through the valve around the cylindrical members.

Extensions or continuations of valve stems 8 and 8' which are indicated in the drawing as 12 and 12', respectively, may, when desired, extend into suitable wells provided in the lower portion of the main valve body and suitable bearing members 13 and 13' may be provided therein to carry the weight and thrust of the movable valve members.

A suitable reservoir or chamber 14 may be provided in the lower portion of the main body of the valve into which any suitable lubricant or cooling fluid may be introduced, if desired, through opening 15 in the body of the valve. Ports 16 may be provided leading from chamber 14 into the wells provided for valve-stems 12 and 12' and, in the case here illustrated, slots 17 are provided in the main valve body extending from chamber 14 past cylindrical members 4 and 4' to the upper portion of the main valve body. The fluid introduced to chamber 14 through opening 15 may thus pass through ports 16 and slots 17 to lubricate and/or cool the friction surfaces of the valve and, in the particular case here illustrated, ports 18 are provided in cylindrical members 4 and 4' to permit the injection of cooling fluid into the main stream of fluid passing through the valve.

As an optional feature of the present invention suitable cooling medium and/or lubricant may, when desired, be introduced through openings 19 and 19' into stuffing boxes 7 and 7', suitable spacing members 20 preferably being provided between the upper and lower sets of packing rings in the stuffing boxes at a point corresponding to the point of introduction of the cooling material. This arrangement may serve to lubricate and/or cool the valve stem at its point of greatest friction (where it passes through the packing) and, except in combination, is not a novel feature of the present invention. However, as a special optional feature of the present invention valve stems 8 and 8' may be drilled, for example, as indicated at 21, permitting passage of the cooling fluid from stuffing boxes 7 and 7' through the valve stems into the main body of the valve above members 4 and 4', the hubs 22 and 22' also being grooved and drilled as indicated at 23. This method of cooling may be utilized either in conjunction with or instead of the method previously described, as desired.

I claim as my invention:

1. A valve for controlling the flow of fluids which comprises, in combination, a main valve body having inlet and outlet ports, two cylindrical, rotatable members positioned within the main valve body and adjoining on a line along their outer circumference, said rotatable members being provided with a port intercepting their line of juncture and connecting the inlet and outlet ports of the valve, means for simultaneously rotating said cylindrical members in opposite directions whereby the effective opening through said port may be increased and decreased, means for introducing a cooling fluid into the valve and passing the same between the rotatable members and the main valve body and means for introducing cooling fluid into the port of said rotatable members while the port is effectively opened.

2. A valve for controlling the flow of fluids which comprises, in combination, a main valve body having inlet and outlet ports, two cylindrical, rotatable members positioned within the main valve body and adjoining on a line along their outer circumference, said rotatable members being provided with a port intercepting their line of juncture and connecting the inlet and outlet ports of the valve, means for simultaneously rotating said cylindrical members in opposite directions whereby the effective opening through said port may be increased and decreased, means for introducing fluid into the valve, other than the main stream of fluid passing through said ports, means for contacting the same with the surfaces of said cylindrical members within the valve and means for introducing the same into the main stream of fluid while flowing through the valve.

3. A valve for controlling the flow of fluids which comprises, in combination, a main valve body having aligned inlet and outlet ports, two cylindrical, rotatable members positioned within the main valve body and adjoining on a line along their outer circumference, said rotatable members having a port intercepting their line of juncture and connecting the inlet and outlet ports of the valve, said port being in alignment with said inlet and outlet ports, means for simultaneously rotating said cylindrical members in opposite directions whereby the effective opening through said port may be changed, a chamber above and beneath the cylindrical members out of the path of flow of the main stream of fluid passing through the valve, channels between the walls of the main valve body and the cylindrical surface of said rotatable members connecting said chambers, means for circulating an auxiliary fluid through said chambers and channels and means for introducing auxiliary fluid into the main stream of fluid passing through the valve.

4. A valve for controlling the flow of fluids which comprises, in combination, a main valve body having inlet and outlet ports, two cylindrical, rotatable members positioned within the main valve body and adjoining on a line along their outer circumference, a port through the rotatable members intercepting their line of juncture and connecting the inlet and outlet ports of the valve, means for simultaneously rotating said cylindrical members in opposite directions whereby the effective opening through said port may be increased and decreased, an auxiliary fluid chamber above and beneath the cylindrical members out of the path of flow of the main stream of fluid passing through the valve, channels between the walls of the main valve body and the cylindrical surface of said rotatable members to connect said chambers and means for introducing the auxiliary fluid into the main stream of fluid flowing through the valve.

WILLIAM R. KINNAIRD.